Figure 5:
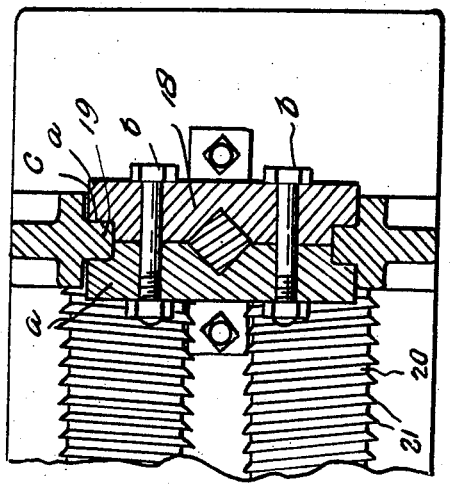

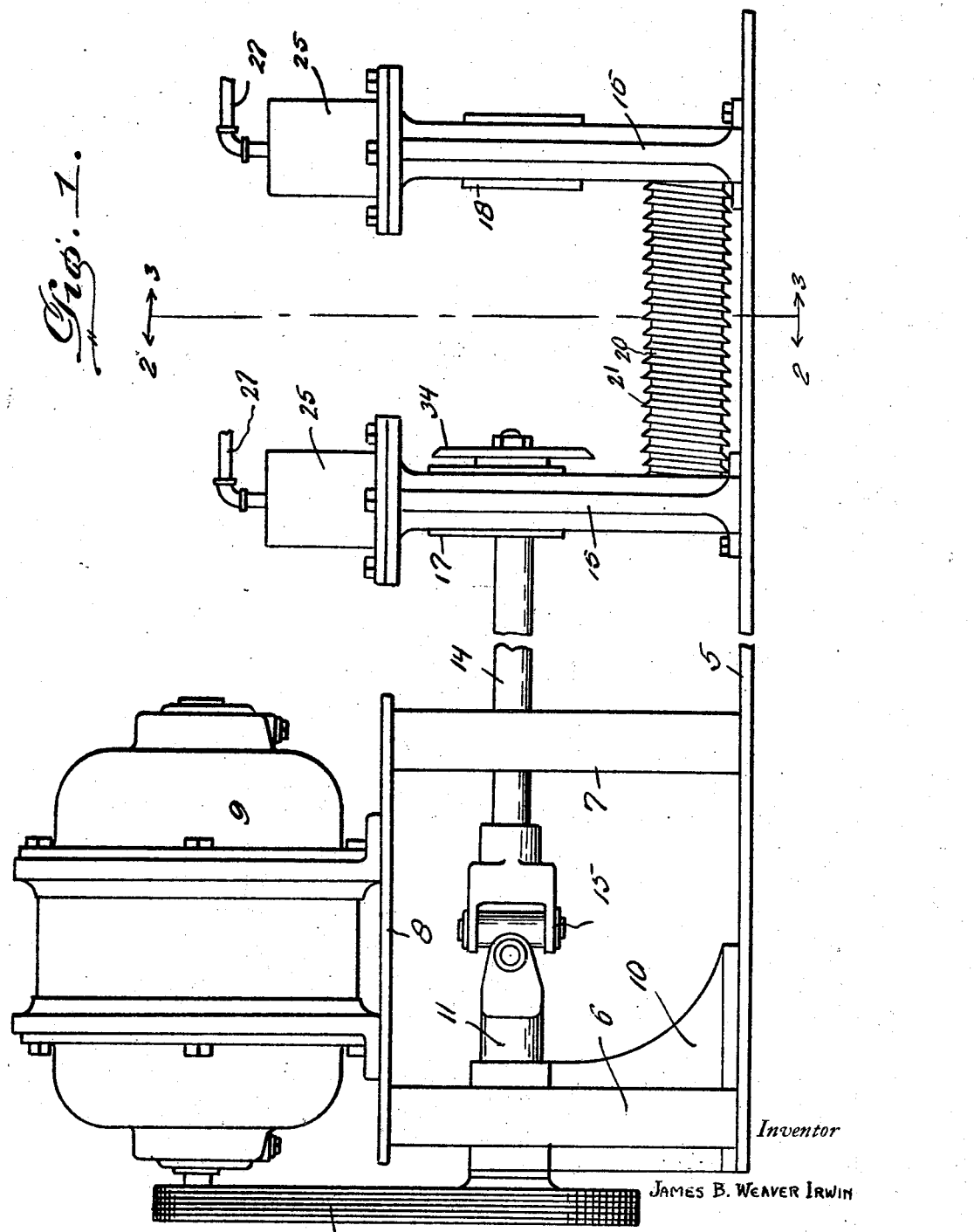

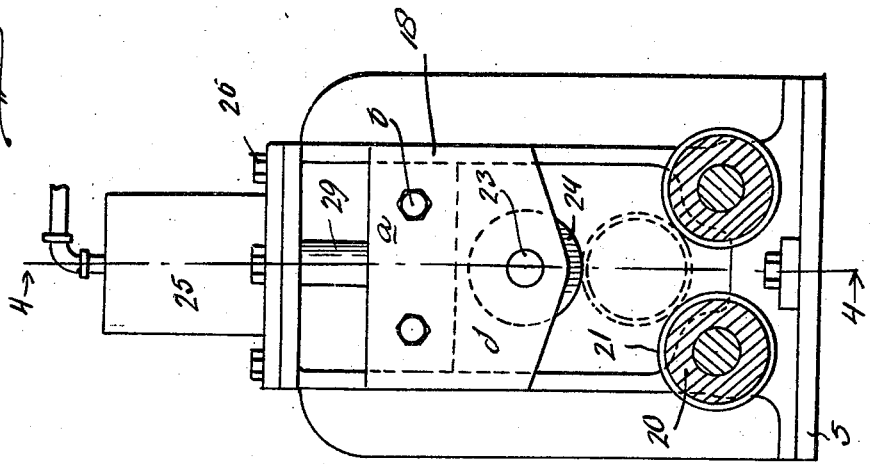
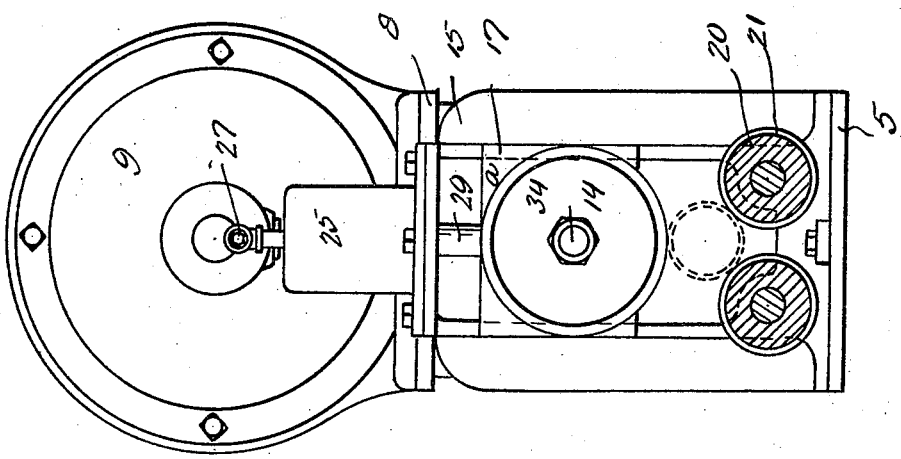

Jan. 1, 1929.  1,697,566
J. B. WEAVER IRWIN
COMBINED FLUE POLISHER AND CUTTING-OFF MACHINE
Filed Oct. 22, 1927  3 Sheets-Sheet 3

Inventor

JAMES B. WEAVER IRWIN

By Clarence A. O'Brien
Attorney

Patented Jan. 1, 1929.

1,697,566

UNITED STATES PATENT OFFICE.

JAMES B. WEAVER IRWIN, OF DENVER, COLORADO.

COMBINED FLUE POLISHER AND CUTTING-OFF MACHINE.

Application filed October 22, 1927. Serial No. 228,001.

The present invention relates to a machine for polishing the ends of flues and cutting off the fag ends at one operation.

In recent years, the method of reclaiming flues by welding on a piece of new material to the old flue is being done by the electrical process, whereas the former method was to use oil furnaces for welding. In this electric welding process, it is necessary that the end of the old flue be cleaned sufficiently so that contact may be made properly between the electrodes. It is also necessary to cut off the fag end of the flue in order to accommodate the welding on of the new piece. In order to effect economy in these operations, this machine is designed to perform two operations simultaneously.

Another very important object of the invention resides in the provision of a machine of this nature wherein the parts are arranged in a compact and convenient manner and are simple in their construction.

Another important object of the invention resides in the provision of a machine of this nature which is comparatively inexpensive to manufacture and operate, is thoroughly efficient and reliable in its operation, and is not likely to easily become out of order.

With the above and numerous other objects in view as will appear as the description proceeds, the invention resides in certain novel features of construction, and in the combination and arrangement of parts as will be hereinafter more fully described and claimed.

Figure 4:
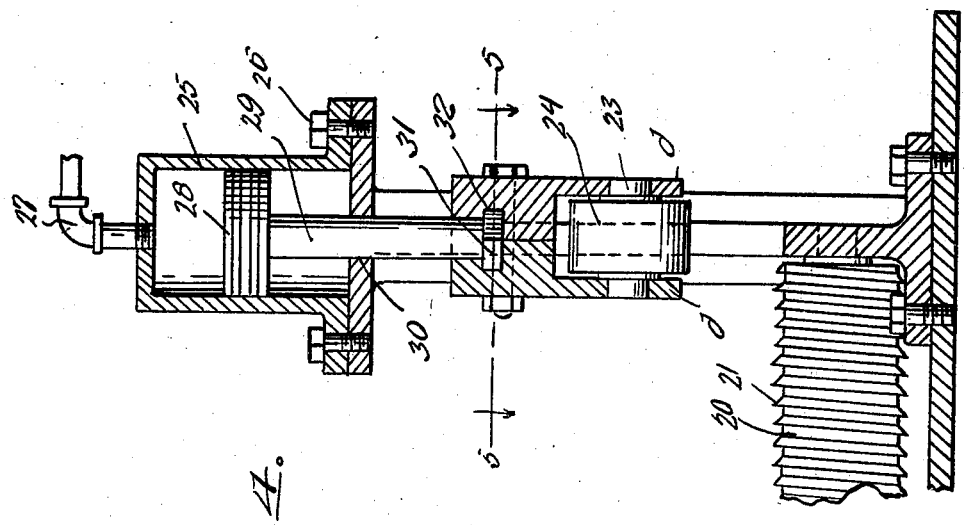

In the drawings:

Figure 1 is a side elevation of the machine embodying the features of my invention, Figures 2 and 3 are vertical transverse sections taken substantially on the lines 2—2 and 3—3 respectively of Figure 1, Figure 4 is a vertical fragmentary longitudinal section taken substantially on the line 4—4 of Figure 3, and Figure 5 is a detail horizontal section taken substantially on the line 5—5 of Figure 4.

Referring to the drawing in detail it will be seen that the numeral 5 denotes an elongated base having supports 6 and 7 rising from one end thereof in spaced relation for supporting a platform 8. An electric motor 9 is mounted on the platform 8. A bearing bracket 10 rises from the base 5 within the support 6 and has journaled in its upper end a horizontal shaft 11 which is operatively connected with the motor 9 through an endless chain and gear mechanism 12 or in any other preferred manner. A shaft 14 is operatively connected with the shaft 11 by means of a universal joint so that the shaft 14 extends through the support 7. Frames 15 and 16 rise from adjacent the other end of the platform 5 and have slidable vertically therein cross heads 17 and 18, respectively. The inner vertical side edges of the frames 15 and 16 are formed with longitudinally extending ribs 19 and the cross heads may be made in two sections $a$ bolted together as at $b$ and having their outer side edges recessed to form channels or grooves $c$ to receive the ribs 19. A pair of rotatable cleaning elements are mounted between the frames 15 and 16 at their lower ends. These rotatable cleaning elements are in the form of cylindrical rollers 20 having spiral cutting ribs 21 formed on the peripheries thereof, the cutting rib of one roller 20 being spiralled oppositely to that of the other, as will be apparent from an inspection of Figure 5. These rollers 20 have their axes disposed horizontally and in spaced parallelism to each other.

The sections $a$ of the cross head 5 are provided with depending ears $d$ in which are journaled the trunnions 23 of a roller 24 disposed between the ears $d$ and projecting slightly therebelow. Cylinders 25 are mounted on the tops of the frames 15 and 16 being bolted in place as at 26 and having pipes 27 leading from the tops thereof. Pistons 28 are slidable in the cylinders 25 and have rods 29 depending downwardly therefrom and slidable through openings 30 in the tops of the frames 15 and 16. The lower ends of these rods 29 terminate in heads 31. The abutting surfaces of the sections $a$ of the cross heads 17 and 18 are recessed as is indicated at 32 for receiving the heads 31 whereby the bolts $b$ may be tightened for securely clamping these heads between the sections $a$ and thus securely fixing the rods 29 to their respective cross head. The shaft 14 is journaled through the cross head 17 with sufficient play to prevent binding and has on its extremity a rotary cutter 34 disposed in a substantially vertical plane.

Fluid pressure such as compressed air or the like is delivered to the tops of the cylinders 25 through the pipe 27 so as to urge the cross heads 17 and 18 downwardly. The end of the flue to be cleaned is placed on the rollers 20 and the roller 18 rests thereon as does also the cutter 34. The electric motor 9 is energized simultaneously with the turning on of the fluid pressure so that as the rotary cutter 34 rotates, the cross heads 17 and 18 are forced downwardly so that the rotary motion of the cutter 34 is transmitted to the flue and the rotary motion of the flue is transmitted to the roller 24 and the cleaning rollers 20. The rotation of these cleaning rollers 20 will cause the spiral ribs 21 to thoroughly clean the exterior surfaces of the flue and simultaneously the cutter 34 will be cutting off the end so as to eliminate the fag ends of the flue. As soon as the cutter severs the flue the flue will cease to rotate and the fluid pressure and the motor should be cut off.

It is thought that the construction, operation, utility, and advantages of this invention will now be quite apparent to those skilled in this art without a more detailed description thereof. The present embodiment of the invention has been disclosed by way of example because in actual practice it attains the features of advantage enumerated as desirable in the statement of the invention and the above description. It will be apparent, however, that changes in the details of construction, and in the combination and arrangement of parts may be resorted to without departing from the spirit of the invention or scope thereof as hereinafter claimed or sacrificing any of its advantages.

Having thus described the invention, what I claim as new is:—

1. In a machine of the class described, a rotatable cleaning element, a roller, means for mounting the roller so that it may be moved toward and away from the element, a rotary cutter, means for mounting the cutter so that it may be moved toward and away from the element, means urging the cutter and the roller toward the element, and means for rotating the cutter whereby a flue may be disposed between the cutter and the roller and the element so that the rotary cutter will simultaneously cut off fag ends of the flue and rotate the flue, said flue causing the rotation of the roller and the element.

2. In a machine of the class described, a rotating cleaning element having a spiral peripheral cleaning rib, a roller, means for mounting the roller so that it may be moved toward and away from the element, a rotary cutter, means for mounting the cutter so that it may be moved toward and away from the element, means for urging the cutter and the roller toward the element, and means for rotating the cutter whereby a flue may be disposed between the cutter and the roller and the element so that the rotary cutter will simultaneously cut off fag ends of the flue and rotate the flue, said flue causing the rotation of the roller and the element so that the spiral rib on the element will scrape the surface of the flue.

3. In a machine of the class described, a pair of parallel spaced cleaning elements, a roller, means for mounting the roller so that it may be moved toward and from the element with its axis in parallelism with the axis of the element, a rotary cutter, means for mounting the rotary cutter so that it may be moved toward and away from the element with the axis of the rotary cutter in substantial parallelism with the axis of the element, means for urging the cutter and the roller toward the elements, and means for rotating the cutter whereby a flue may be composed between the cutter and the roller and the elements so that the rotary cutter will simultaneously cut off fag ends of the flue and rotate the flue, said flue causing the rotation of the roller and the elements.

4. In a machine of the class described, a pair of parallel spaced rotatable cleaning elements, having oppositely spiralled ribs on the peripheries thereof, a roller, means for mounting the roller so that it may be moved toward and away from the elements with the axis of the roller in parallelism with the axis of the elements, a rotary cutter, means for mounting the cutter so that it may be moved toward and away from the elements with the axis of the rotary cutter in substantial parallelism with the axis of the elements, means urging the cutter and the roller toward the elements, and means for rotating the cutter whereby a flue may be disposed between the cutter and roller and the element so that the rotary cutter will simultaneously cut off fag ends of the flue and rotate the flue, said flue causing the rotation of the roller and the elements so that the oppositely wound spiral ribs on said elements will scrape the outer surface of the flue.

5. In a machine of the class described, a rotary cleaning element, a roller, means for mounting the roller so that it may be moved toward and away from the element, a rotary cutter, fluid pressure responsive means for urging the rotary cutter and the roller toward the element, and means for rotating the cutter whereby a flue may be disposed between the cutter and roller and the element so that the rotary cutter will simultaneously cut off fag ends of the flue and rotate the flue, said flue causing the rotation of the roller and element.

6. In a machine of the class described, a base, a pair of frames projecting from the base in spaced relation, cross heads in the frame slidable toward and away from the base, a pair of cleaning rolls journaled between the frames adjacent the base, means urging the cross heads toward the base, a roller mounted in one cross head, a rotary cutter mounted in the other cross head, and means for rotating the rotary cutter whereby a flue may be disposed between the rotary cutter and roller, and the rolls so that the rotary cutter will simultaneously cut off fag ends of the flue and rotate the flue, said flue causing the rotation of the roller and the rolls.

7. In a machine of the class described, a base, a pair of frames projecting from the base in spaced relation, cross heads in the frame slidable toward and away from the base, a pair of cleaning rollers journaled between the frames adjacent the base, means urging the cross heads toward the base, a roller mounted in one cross head, a rotary cutter mounted in the other cross head, and means for rotating the rotary cutter whereby a flue may be disposed between the rotary cutter and roller, and the rolls so that the rotary cutter will simultaneously cut off fag ends of the flue and rotate the flue, said flue causing the rotation of the roller and the rolls, said rolls having oppositely wound spiral ribs on the peripheries thereof.

8. In a machine of the class described, a base, a pair of frames projecting from the base in spaced relation, cross heads in the frame slidable toward and away from the base, a pair of cleaning rollers journaled between the frames adjacent the base, means urging the cross heads toward the base, a roller mounted in one cross head, a rotary cutter mounted in the other cross head, and means for rotating the rotary cutter whereby a flue may be disposed between the rotary cutter and roller, and the rolls so that the rotary cutter will simultaneously cut off fag ends of the flue and rotate the flue, said flue causing the rotation of the roller and the rolls, said rolls having oppositely wound spiral ribs on the peripheries thereof, said means for urging the cross heads toward the base comprising cylinders mounted on the frames remote from the base, pistons slidable in the frames, pipes leading to the ends of the cylinders remote from the base, rods connected with the pistons and slidable through the frames and engaged with the cross heads so that fluid pressure may be delivered to the cylinders through the pipes to urge the cross heads toward the base.

9. In an apparatus of the class described, a base, a pair of frames projecting from the base, cross heads slidable in the frames toward and away from the base, means normally urging the heads toward the base, a roller mounted in one of the heads, a rotary cutter mounted in the other head, means for rotating the cutter, and a rotatable cleaning element between the frames adjacent the base.

10. In a machine of the class described, a base, a pair of frames projecting from the base in spaced parallelism to each other, a roller journaled between the frames with its axis at right angles to the frame and parallel with the base, cross heads slidable in the frame toward and away from the base, a roller carried by one of the cross heads with its axis in parallelism with the axis of the cleaning element, a rotary cutter carried by the other cross head with its axis in substantial parallelism with the cleaning element, means for rotating the cutter, and means at the remote portions of the frame from the base for urging the cross heads toward the base whereby the flue may be disposed between the cutter and roller and the element, so that the rotary cutter will simultaneously cut off fag ends of the flue and rotate the flue, said flue causing the rotation of the roller and said element.

11. In a machine of the class described, a base, a rotatable cleaning element, means for mounting the rotatable cleaning element with its axis in parallelism with the base, a roller, means on the base for mounting the roller so that it may be moved toward and away from the element, a rotary cutter, means for mounting the cutter so that it may be moved toward and away from the element, means urging the cutter and the roller toward the element, and means for rotating the cutter whereby a flue may be disposed between the cutter and roller and the element so that the rotary cutter will simultaneously cut off the fag ends of a flue and rotate the flue, said flue causing the rotation of the roller and said element.

12. In a machine of the class described, a base, a platform at one end of the base, means for mounting the platform in spaced parallelism with the base, a prime mover mounted on the platform, a bearing bracket projecting from the base to terminate between the base and the platform, a shaft journaled in said bearing bracket, an operative connection between the shaft and rotor, a second shaft, a universal joint between the two shafts, a pair of frames projecting from the base adjacent the other end thereof, said frames being disposed in spaced parallelism, cross heads slidable in the frames toward and away from the base, said second shaft being journaled in the cross head in the frame adjacent the platform, a rotary cutter on said second shaft adjacent the cross head in which it is journaled, a roller journaled in the other cross head adjacent the base, a pair of rotatable cleaning elements journaled between the frame adjacent the base having their axis disposed in spaced parallelism in respect to each other and in respect to the base, a pair of cylinders one on each frame remote from the base, pistons in the cylinders, rods engaged with the pistons and extending through said remote ends of the frames and engaged with the cross heads, and means for delivering fluid pressure to the cylinders to urge the cross heads toward the cleaning elements.

In testimony whereof I affix my signature.

JAMES B. WEAVER IRWIN.